United States Patent [19]

Shaffer

[11] 4,099,378
[45] Jul. 11, 1978

[54] BLOCKING VALVE FOR POWER STEERING FOR LIFT TRUCKS

[75] Inventor: Walter M. Shaffer, Peoria, Ill.

[73] Assignee: Caterpillar Tractor Co., Peoria, Ill.

[21] Appl. No.: 833,897

[22] Filed: Sep. 16, 1977

Related U.S. Application Data

[63] Continuation of Ser. No. 759,951, Jan. 17, 1977, abandoned.

[51] Int. Cl.² .............................................. F15B 1/02
[52] U.S. Cl. ........................................ 60/413; 60/418; 60/433; 60/DIG. 2; 137/115
[58] Field of Search ........... 60/413, 418, 433, DIG. 2; 137/115, 522, 523, 528

[56] References Cited

U.S. PATENT DOCUMENTS

| 2,330,739 | 9/1943 | Piron | 60/DIG. 2 X |
|---|---|---|---|
| 2,392,471 | 1/1946 | Fox | 60/417 |
| 2,968,927 | 1/1961 | Quayle | 60/371 |
| 3,014,344 | 12/1961 | Arnot | 60/433 |
| 3,083,533 | 4/1963 | Schenkelberger | 60/415 |
| 3,170,536 | 2/1965 | Van House et al. | 180/82 |
| 3,274,779 | 9/1966 | Klein | 60/413 X |
| 3,439,768 | 4/1969 | Medley | 180/79.2 |
| 3,570,519 | 3/1971 | Bianchetta | 137/101 |
| 3,640,301 | 2/1972 | Jania | 137/101 |
| 3,911,679 | 10/1975 | Matthews | 60/413 |
| 3,962,871 | 6/1976 | Blaha et al. | 60/433 |

*Primary Examiner*—Edgar W. Geoghegan
*Attorney, Agent, or Firm*—Wegner, Stellman, McCord, Wiles & Wood

[57] ABSTRACT

An improved valving arrangement and actuator is provided for a power steering unit for a lift truck, and in particular for a battery powered lift truck. To the conventional implement valve is added an accumulator charging means which includes an additional valve, herein called a "blocking valve," which additional valve is downstream from the implement valve and which additional valve, when actuated, blocks the flow of fluid through the implement valve to thereby build up pressure for charging an accumulator. The blocking valve includes a blocking spool which operates against a pressure-actuated pilot plunger such that when the pressure in the accumulator reaches or exceeds a predetermined amount, the pilot plunger shifts the blocking spool to permit the fluid to again flow through the implement valve. The blocking spool is actuated by a force acting on a control member associated with the lift or tilt levers when said force is sufficient to overcome the retaining force provided by the reduced pressure in the accumulator acting on said pilot plunger.

24 Claims, 3 Drawing Figures

BLOCKING VALVE FOR POWER STEERING FOR LIFT TRUCKS

This is a continuation, of application Ser. No. 759,951 filed Jan. 17, 1977 now abandoned.

BACKGROUND OF THE INVENTION

1. Field of the Invention

This invention relates to lift trucks, and more particularly to a motor driven hydraulic system for a power steering unit of a battery powered lift truck.

2. Description of the Prior Art

Lift trucks, and in particular higher volume range battery powered lift trucks, have generally not made use of power steering units because of the high costs of installing and operating such units and because of the heavy drain on the power of the battery.

Part of the expense is the requirement of an additional electric motor and its controls for use just for power for the power steering unit. When the vehicle is in operation, the additional electric motor and pump must be driven at full speed at all times, whether or not there is a demand for the fluid for steering purposes. It is necessary that the continuous pumping of oil through the open center power steering unit be maintained readily available for instant steering. The additional electric motor and pump affects approximately a ten percent drain on the battery capacity for the purposes of operating the power steering unit.

SUMMARY OF THE INVENTION

A power steering system has a closed center hydrostatic steering unit, an implement valve, a blocking valve, an implement pump, a motor and an accumulator. The motor-driven implement pump is connected to the implement valve and blocking valve and through a check valve to the accumulator and to the hydrostatic steering unit. The accumulator is connected to a pilot plunger on the blocking valve, which pilot plunger is associated with a blocking spool in said blocking valve. An implement lever is operatively connected to a control member which in turn is operatively connected to the blocking spool such that reduced pressure in the accumulator will allow the blocking spool to shutoff the flow through the implement valve and to continue to run the motor and pump upon return of the implement lever to a neutral position. Shutting off the flow through the implement drive diverts the flow from the implement pump through the check valve to charge the accumulator. If the pressure in the accumulator exceeds a predetermined amount at the time the control member is moved or when the pressure in the accumulator reaches or exceeds a predetermined amount, the pilot plunger will shift the blocking spool to permit flow from the implement pump through the implement valve, through the blocking valve and to the tank and will shutoff the motor and pump.

The accumulator charging means has the blocking spool or control plunger activated by the control member in cooperation with the implement levers, such as the lift and/or tilt levers, and either activates or deactivates the motor and the pump, depending upon the position of the blocking spool. Therefore, when the accumulator is fully charged and the lift or tilt levers are inoperative, the motor and pump are not operating. The blocking spool is operative for charging the accumulator following the actuation of either the tilt lever or the lift lever provided the accumulator pressure is below a predetermined level whereupon the motor and pump will continue to be driven and fluid will be circulated as desired.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
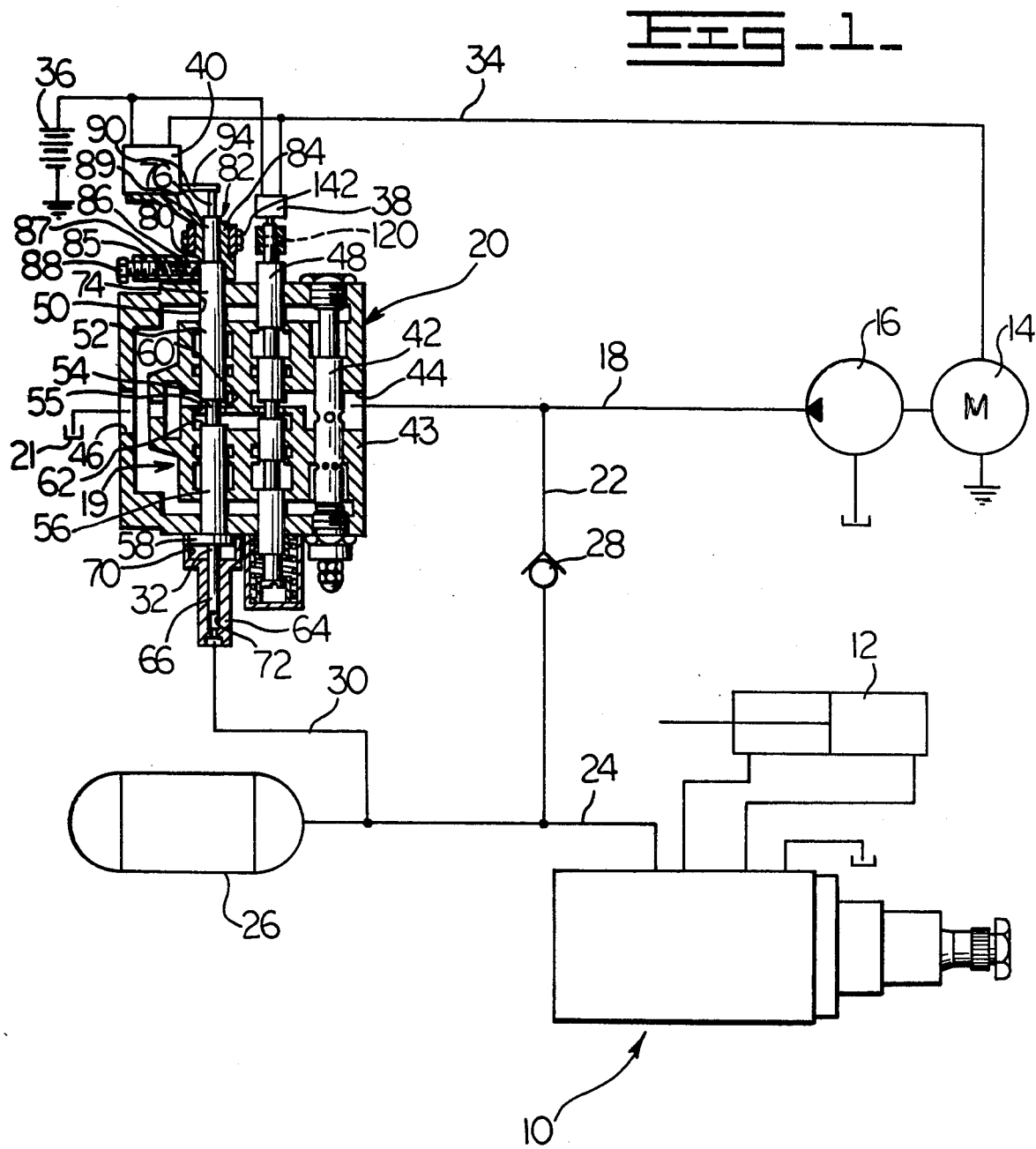
FIG. 1 is a schematic diagram of the preferred embodiment of the invention.

Referring specifically to FIG. 1, a closed center hydrostatic steering unit 10 is illustrated connected to a steering cylinder 12. An implement motor 14 drives an implement pump 16 which is connected by a line 18 to an implement valve 20 and blocking valve 19 to a tank 21. As illustrated, the blocking valve 19 is integral with the implement valve 20, but it is to be understood that they could be separate valves. A branch line 22 is connected to line 18 between the pump 16 and the valve 20 and is connected to supply line 24 running from the steering unit 10 to an accumulator 26. A one-way check valve 28 is positioned in the line 22 so as to permit the one-way flow of fluid from the pump 16 to the steering unit 10 and accumulator 26. A line 30 runs from the supply line 24 to a pilot plunger 32 in the implement valve 20. An electric wire 34 runs from the implement motor 14 to a source of electric power 36 through switches 38 and 40. The motor 14 could be any prime mover that is activated by elements of the implement valve 20 contacting switches 38,40, clutches (not shown) or the like, in a manner that will be described hereinafter.

Referring to the implement valve 20, a conventional relief valve spool 42 is slidably mounted in valve body 43 and spans the line 18 between the inlet 44 and the outlet 46 of the valve in the usual manner of a relief valve. The relief valve 42 is designed to dump fluid in the line 18 and valve 20 into the tank 21 on those occasions when the pressure in the valve 20 exceeds an upper predetermined limit. The relief valve 42 operates in the body 43 of the valve 20 in a conventional fashion and its operation will not be described more in detail herein.

Figure 2:
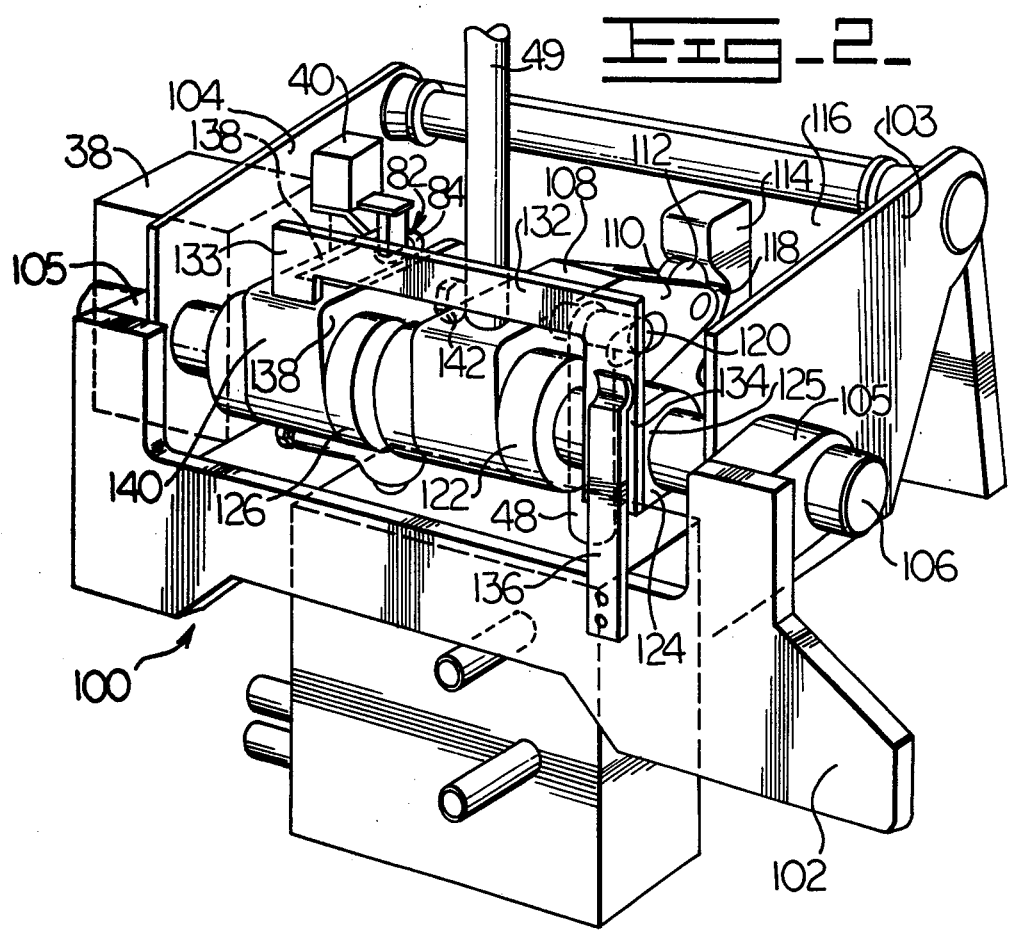
FIG. 2 is a perspective view of a modified version of the actuator controls for the lift truck.

An operating plunger or spool 48 is positioned in the body 43 of the implement valve 20 and is adapted to be physically shifted along its axis upon actuation of an appropriate control lever 49, as shown in FIG. 2 and as will be described in detail hereinafter, so as to operate the appropriate element of the lift truck by feeding fluid under pressure to the appropriate parts of the operating unit. For instance, the operating plunger 48 may be a tilt plunger or a lift plunger and, upon actuation, will feed fluid to the appropriate tilting or lifting apparatus on the lift truck.

In the illustrated form of the invention, the valve body 43 has a cavity 50 in which is slidably received an accumulator charging means in the form of a control plunger or blocking spool 52. It is to be understood that the blocking valve 19 could have the control plunger or blocking spool 52 seated in a separate valve body between the implement valve 20 and the tank 21 without departing from the invention. The control plunger 52 has a reduced diameter portion 54 which spans the opening 55 in the line or passageway from the inlet 44 to the outlet 46 communicating with the tank 21. Adjacent the reduced diameter portion 54 are spaced apart seats or shoulders 60 and 62 with shoulder 60 being of a size to cooperate with the opening 55 in the passageway so that when blocking spool 52 is moved downward, as viewed in FIG. 1, it will close said opening 55, the flow of fluid through the passageway in the valve is thereby shutoff. The one end 56 of the blocking spool 52 includes an enlarged end portion 58 which acts as a stop for limiting the upward travel of the blocking spool 52.

The pilot plunger 32 is comprised of a housing 64 attached to the valve body 43 in axial alignment with the blocking spool 52 and has a guide spool 66 slidable in a cylinder 72 in said housing 64 with one end of the spool 66 abutting the enlarged end portion 58 of said blocking spool 52. The line 30 is connected to the housing 64 and communicates with the cylinder 72 and with the other end of the spool 66 so that pressure in the line 30 will urge the guide spool 66 against the end of the blocking spool 52 to move the blocking spool 52 to a position where the opening 55 permits fluid to flow through the implement valve 20 and past the blocking spool 52. The control plunger or blocking spool 52 has another end portion 74 slidable in the body 43 with a portion 76 reduced in cross section and integrally joined therewith in axial alignment with the axis of said control plunger or blocking spool 52. The junction between the reduced portion 76 and the end portion 74 forms a shoulder 80 facing axially from said blocking spool 52. The reduced portion 76 and the end portion 74 of the blocking spool 52 are operatively encircled by a control member 82.

The control member 82 is comprised of a sleeve 84 having an internal cross section coinciding with the cross section of portion 76 on the blocking spool 52 and encircles said reduced portion 76 and has a transverse cylindrically-shaped housing 85 in which is mounted a ball 86 urged by spring 87 and adjusting screw 88 against the surfaces of either portion 74 or portion 76 of the blocking spool 52. The spring 87 urges the ball 86 against the side of the end portion 74 when the blocking spool 52 is in position with the shoulder 60 spaced from the edge of the opening 55 whereby fluid from pump 16 flows freely past the blocking spool 52. When the blocking spool 52 has been displaced so that the shoulder 60 closes the opening 55, the ball 86 will engage with the shoulder 80 and will bear against the surface of the reduced portion 76. The force of the spring 87 and the ball 86 on the shoulder 80 will hold the blocking spool 52 in position to shutoff the flow of fluid through the implement valve 20 whereby the fluid will be forced past the check valve 28 and into the accumulator 26. When the accumulator 26 has been charged to the predetermined level, the pressure in the line 30 from the accumulator 26 to the pilot plunger 32 will force the guide spool 66 against end portion 58 of the blocking spool or control plunger 52 until the force of the spring 87 and ball 86 on shoulder 80 is overcome whereupon the blocking spool 52 will be moved upward, as viewed in FIG. 1, to open the passageway through the valve 20.

A support 89 on the control member 82 positions the switch 40 with a blade 94 in alignment with a probe 90 on the end of the end portion 76 of the blocking spool 52. When the switch blade 94 is in the raised position of FIG. 1, the switch 40 is considered to be open and no current will flow through the switch 40 to the motor 14. When the blade 94 is deflected downwardly, such as when the blocking spool 52 is in position to engage shoulder 60 with the edges of opening 55 to shutoff flow through the passageway in the valve, the switch 40 is closed and current from the source 36 will flow through the switch 40 to the motor 14.

As shown in FIG. 2, an implement control mechanism 100 is illustrated which is part of a control arrangement located in the operator's compartment of the lift truck. A vertical frame 102 is mounted on the frame of the vehicle and has a pair of spaced side plates 103,104 extending transversely therefrom. A pair of mounting blocks 105 are mounted on the plates 103,104 for supporting the ends of a shaft 106 extending through said plates. One actuating lever 49 is shown connected to an actuating shoe 108 which is rotatably mounted on shaft 106 and has an outwardly projecting bifurcated portion 110 rotatably supporting a roller 112 in rolling engagement with detent bar 114 on plate 116. When roller 112 engages in detent 118 in bar 114, the lever 49 and the operating plunger 48 connected thereto through cross pin 120 is in the neutral or non-energizing position of the control. The lever 49 connected to plunger 48 is one of several such levers that may be used on a lift truck. The lever 49 may be a tilt lever, for tilting the fork on the truck, or may be a lift lever, for lifting the fork on the truck.

When the handle end of the lever 49 is moved toward the plane of the vertical frame 102, the shoe 108 and sleeve 122, carried by the shoe 108, are rotated relative to the shaft 106 and one part of the lever 49 engages with a stiff U-shaped plate 132. The U-shaped plate 132 has one leg 133 rigidly attached to a pivoted bracket 140 carried by a sleeve 126 which is rotatably mounted on said shaft 106. The other leg 134 of the U-shaped plate 132 is fastened to a flat side 125 of a bearing block 124, which block 124 is rotatably mounted on said shaft 106. A leaf spring 136 has one end portion mounted on the frame 102 with the other end portion bearing against the leg 134 of the plate 132 to urge said leg 134 and said plate 132 to a vertical position. Therefore, movement of the lever 49 into contact with the plate 132 will not only rotate the shoe 108 and sleeve 122, but also will rotate the pivoted bracket 140 and sleeve 126. The roller 112 on the shoe 108 rides up the side of the detent 118 in bar 114 and contacts switch 38 to start the motor 14 and pump 16 and, at the same time, the shoe 108 pulls plunger 48 upward to operate the appropriate function of the lift truck. Return of the lever 49 to the neutral position will lower the shoe 108 and break the circuit to the motor 14 and will return the roller 112 to the detent 118 with the sleeve 122 rotating relative to the shaft 106. The plate 132 and pivoted bracket 140 will not return with the lever 49 even under the urging of the spring 136 unless a predetermined condition exists, as will be described in detail hereinafter.

The pivoted bracket 140 has a radially extending bifurcated portion 138 pivotally secured by bolts 142 to the opposite sides of the vertical sleeve 84 of the control member 82. Raising the bifurcated portion 138 of the pivoted bracket 140 raises the control member 82 and support member 89 relative to the blocking spool 52 so that the ball 86 will roll up the portion 74, snap over the shoulder 80 and bear against portion 76 of the blocking spool or control plunger 52. Since the support member 89 has been moved axially relative to the blocking spool or control plunger 52, the probe 90 will permit switch blade 94 to pivot clockwise as viewed in FIG. 1 into position to close the switch 40. At this point, both switch 38 and switch 40 are closed permitting current to flow to the motor 14 to drive the pump 16. Return of the lever 49, sleeve 122 and shoe 108 to the neutral position will open switch 38, as described hereinabove, but said return movement of the lever 49 is independent of the plate 132, pivoted bracket 140 and control member 82 so that switch 40 will remain closed as long as the resistance of the spring-urged ball 86 on the shoulder 80 and any upward force on the blocking spool or control plunger 52 by the pilot plunger 32 exceeds the force of the spring 136 on the plate 132 and on the pivoted bracket 140.

Figure 3:
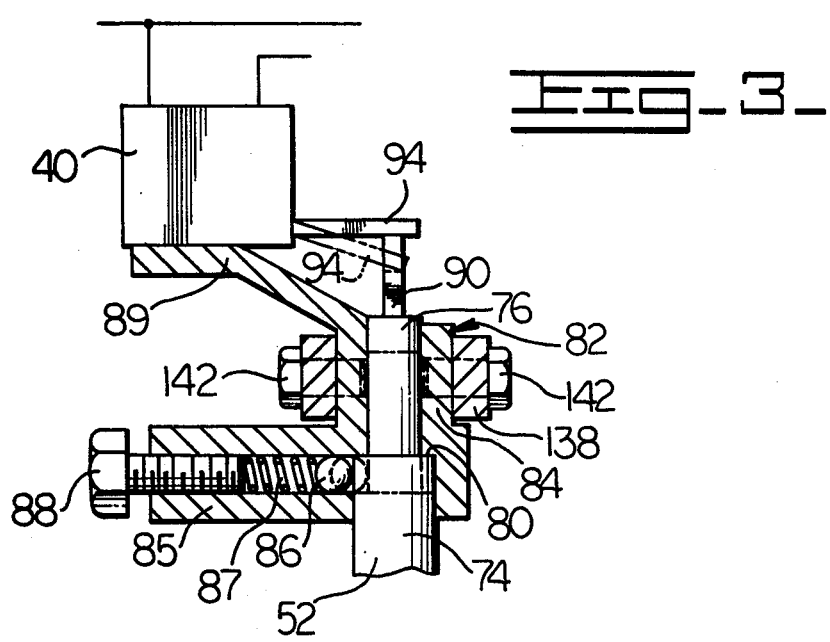
FIG. 3 is an enlarged elevational view of the operative end of the control plunger or blocking spool and its connection to a control switch.

If the pressure in the accumulator 26 is lower than a predetermined value, the pilot plunger 32 will not exert sufficient upward force on the blocking spool or control plunger 52 to resist the force of the spring 136 and as a result, the spring 136 will pivot the pivoted bracket 140 and sleeve 126 about the shaft 106 forcing the control member 82 (with the ball 86 bearing on the shoulder 80 of the control plunger 52) and the blocking spool or control plunger 52 downward to close the shoulder 60 over the opening 55 in the passageway in the valve to stop the flow of fluid from the pump 16 through the implement valve 20 and the blocking valve 19. The switch 40 is still closed (blade 94 being in the dotted position of FIG. 3) passing current to the motor 14. The fluid from the pump 16 in line 18 will be forced to flow through the check valve 28 in line 22 to the steering unit 10 and to the accumulator 26. When the accumulator pressure reaches the predetermined value, the fluid in line 30 will activate the pilot plunger 32 urging the guide spool 66 in the pilot plunger 32 upward against the blocking spool or control plunger 52 until the force overcomes the resistance of ball 86 on the shoulder 80, permitting the blocking spool or control plunger 52 to move upward past the ball 86 and at the same time to open the passageway in the valve by raising shoulder 60 from the edge of the opening 55. The probe 90 on the blocking spool or control plunger 52 will raise blade 94 on the switch 40 to open the switch, shutting off current to the motor 14, thereby stopping the running of the motor 14 and pump 16.

By way of summary, appropriate movement of the lever 49 will raise the plunger 48 and close the switch 38 to start the motor 14 and pump 16. The movement of plunger 48 will pass fluid to the appropriate mechanism, such as the lift mechanism for raising the fork of the truck. The lever 49 will simultaneously raise the control member 82 relative to the blocking spool or control plunger 52 to close the switch 40 and cock the detent ball 86 above the shoulder 80. When the lever 49 is returned to its neutral position, switch 38 will open. If, at that point, the pressure in the accumulator 26 is at the predetermined level, the force of spring 136 will overcome the holding force of ball 86 and spring 87 on shoulder 80, whereupon the control member 82 will ride down on the end portion 76 of the blocking spool or control plunger 52 opening switch 40 and shutting off motor 14 and pump 16. If, on the other hand, the pressure in the accumulator 26 is below the predetermined level, the pilot plunger 32 will not support the blocking spool or control plunger 52 and, accordingly, the spring 136 will drive the pivoted bracket 140 and control member 82 downward with the ball 86 bearing on shoulder 80 to drive the blocking spool or control plunger 52 downward to close the passageway in the valve. The switch 40 is still closed passing current to the motor 14 to drive the pump 16 and charge the accumulator 26. When the accumulator 26 is charged, the pilot plunger 32 will raise blocking spool or control plunger 52, opening the passageway in the valve and overcoming the holding force of the spring 87 and ball 86 on the shoulder 80. The blocking spool or control plunger 52 will open the switch 40 to shutoff the motor 14 and pump 16.

Since the motor is only operated when fluid is needed to drive an actuating mechanism, such as the tilt, lift or the like of the truck, and when the accumulator pressure is below a predetermined level, substantial power is saved, drain on the battery is minimized and the life span of the motor and pump is extended.

I claim:

1. In a hydraulic system having a prime mover, a pump driven by said prime mover, an accumulator, a supply tank, an implement actuating unit connected to said accumulator, an implement actuating valve between the pump and the tank, a check valve permitting flow from the pump to the accumulator, an accumulator charging means for selectively controlling the flow from the pump to the accumulator, holding means communicating with said accumulator for holding said charging means in the open position, control means slidably carried on said charging means and having retaining means for retaining said control means in one of at least two positions relative to said charging means, means carried by said control means and selectively activated by said charging means for driving said prime mover and pump, a lever operatively connected to said control means for moving said control means in one direction only relative to said charging means until said retaining means seats on an abutment on said charging means, and resilient means urging said control means and said charging means in a direction opposite to the direction of movement by said lever and against the force of the holding means whereby low pressure in the accumulator will permit the resilient means to drive the control means and the charging means to a position to block the flow through the implement valve and to close the means for selectively activating said prime mover and pump whereby the pump will charge the accumulator and upon completing the charge of the accumulator, pressure in the accumulator will cause the holding means to move the charging means to open the flow through the implement valve and to urge the charging means to unseat the retaining means from the abutment to open the selectively activated means and shutoff the prime mover and pump.

2. In the hydraulic system of claim 1 wherein said charging means comprises a blocking spool axially slidable from said blocking position to said open position, said abutment being located on one end portion of said blocking spool, said control means being slidable on said end portion of the blocking spool, said retaining means comprising a ball being carried by said slidable portion of the control means and being urged into contact with the side of said blocking spool or with said abutment on said blocking spool.

3. In the hydraulic system of claim 1 wherein said holding means comprises a plunger operatively associated with said charging means to hold said charging means in a flow open position when the pressure in said accumulator is at a predetermined high level and said plunger will permit the charging means to be moved to a flow blocking position upon the pressure in the accumulator falling below a predetermined level.

4. In the hydraulic system of claim 1 wherein said holding means is a pilot plunger axially aligned with one end of said charging means, said pilot plunger being in communication with said accumulator whereby a predetermined pressure range in said accumulator will hold the pilot plunger in position to maintain the charging means open and a second lower predetermined pressure range will reduce the holding force in the pilot plunger whereby the charging means will be moved to a flow blocking position.

5. In the hydraulic system of claim 1 wherein the implement valve includes at least one spool for activating an implement function, said spool being operatively connected to said lever and a second means for selectively activating said prime mover and pump actuated by said spool when said lever activates said spool whereby movement of said lever initially activates said second means, the prime mover, the pump and the implement function through activation of said spool.

6. In a hydraulic system having a prime mover, a pump driven by said prime mover, an accumulator, a supply tank, an implement actuating unit connected to said accumulator, an implement valve between the pump and the tank, a check valve permitting flow from the pump to the accumulator, in combination an accumulator charging means for selectively controlling the flow from the pump to the accumulator, holding means communicating with said accumulator for holding said charging means in the open position, control means slidably carried on said charging means and being responsive to movement in one direction upon mechanical operation of said implement valve, retaining means for resiliently retaining said control means in at least one position relative to said charging means, means for moving said charging means and said control means with said retaining means retained in said one position on said charging means in a direction opposite to the direction of movement created by said mechanical operation and independent of said mechanical operation of said implement valve, whereby low pressure in the accumulator will permit said last-named means to drive the control means and the charging means to a position to block the flow through the implement valve and to actuate said prime mover and pump whereby the pump will charge the accumulator and upon completing the charge of the accumulator pressure in the accumulator will activate the holding means against the charging means to open the flow through the implement valve, to urge the charging means to overcome the retaining means, and to shutoff the prime mover and pump.

7. In a hydraulic system of claim 6 wherein said control means comprises a slidable portion slidably mounted on one end portion of said charging means, said end portion having a detent formed therein, said retaining means comprises a spring-urged ball on said slidable portion engaging selectively with said end portion and with said detent whereby with said ball engaging said detent the charging means can be moved to a fluid closed position or can be held in a fluid closed position as long as the pressure in the accumulator is low and whereby when the pressure in the accumulator reaches a predetermined level, the holding means will urge the charging means to unseat the ball from the detent and to open the fluid flow through the implement valve.

8. In the hydraulic system of claim 7 wherein said mechanical operation of the implement valve is a lever movable in one direction to open the implement valve and to move the control means along the end portion of the charging means until the ball of the retaining means seats in said detent and said lever being movable in the other direction to return said implement valve to a position to cutoff the implement function, said return of said lever being independent of the movement of said control means, said resilient means bearing on said control means and on said charging means for urging both toward the fluid closed position whereby when the force of the holding means for holding said charging means in the open position is overcome by the resilient means, the charging means will be moved to close the flow through the valve and to actuate the prime mover and pump.

9. In a hydraulic power supply of claim 8 wherein said holding means is a pilot plunger which is connected to said accumulator whereby the amount of holding force in said pilot plunger is dependent upon the amount of pressure in the accumulator.

10. In the hydraulic system of claim 6 wherein said retaining means is a ball carried by said control means which ball is spring urged into engagement with either the side of the charging means or with a detent formed in the side of said charging means whereby the force of said pilot plunger needed to move the charging means to open flow through said valve must exceed the force of said ball seated in said detent and the force of said means for moving said charging means and said control means.

11. A hydraulic system having a pump, means for driving said pump, an implement valve between the pump and a tank, an accumulator, means permitting flow from the pump to said accumulator, an accumulator charging means disposed between said implement valve and said tank for selectively controlling flow of fluid to the accumulator, control means slidable on said charging means and responsive to mechanical operation in one direction to permit said accumulator charging means to shift to an open position, means for urging said control means in the opposite direction independent of said mechanical operation to shift said accumulator charging means to a closed position, means for holding said accumulator charging means in said open position, said control means having a retaining means for retaining said control means in one position relative to said accumulator charging means, and means activated upon said accumulator charging means being moved to the closed position for activating said means for driving said pump whereby low pressure in the accumulator will permit the resilient means to drive the control means and the accumulator charging means to said position to block the flow through the implement valve and to activate said means for driving said pump to charge the accumulator and whereby upon completing the charge, the pressure in the accumulator will force the holding means to move the accumulator charging means to release said retaining means from said one position to permit flow through the implement valve, and to deactivate the means for driving the pump.

12. In the hydraulic system of claim 11 wherein said control means includes a slidable portion for sliding on said charging means and said retaining means includes a ball spring-urged on said slidable portion into contact with said charging means and, in said one position, seated in a detent in said charging means.

13. In the hydraulic system of claim 11 wherein the implement valve includes at least one actuating spool for activating an implement function, said actuating spool being operatively connected to said mechanical operation and a second means actuated by said actuating spool when said mechanical operation activates said actuating spool whereby movement of said mechanical operation initially activates the means for driving said pump and the implement function through activation of said actuating spool.

14. In the hydraulic system of claim 13 wherein said mechanical operation is moved to return said actuating spool to a position to cutoff the implement function and to open said second means, said return of said mechanical operation is independent of said control means, whereby when the force of the holding means for holding said charging means in the open position is overcome by the force of the means for urging said control means and charging means to the closing position, the charging means will be moved to close the flow through the valve and the means for controlling the means for driving the pump will be closed to drive the pump.

15. In the hydraulic system of claim 11 wherein said holding means is a pilot plunger connected to said accumulator whereby the amount of holding force in said pilot plunger is dependent upon the amount of pressure in the accumulator.

16. A hydraulic system having a pump driven by a prime mover, an implement valve between the pump and a tank, an accumulator, means permitting flow from the pump to said accumulator, an accumulator charging means disposed between said pump and said tank for selectively controlling flow of fluid to the accumulator, control means responsive to mechanical operation of said implement valve actuation in one direction to permit said accumulator charging means to shift to an open position, means for holding said accumulator charging means in said open position, said control means having a slidable portion on said accumulator charging means and having a retaining means for holding said slidable portion in one of several positions relative to said accumulator charging means, a switch carried by said slidable portion and selectively activated by said accumulator charging means whereby closing of said switch will activate said prime mover and pump, resilient means urging said control means against said accumulator charging means through the holding force of said retaining means being seated in one predetermined position whereby low pressure in the accumulator will permit the resilient means to drive the control means and the accumulator charging means to a position to block the flow through the implement valve and to close the switch whereby the prime mover and pump will operate to charge the accumulator and whereby upon completing the charge, the pressure in accumulator will force the holding means to move the accumulator charging means to unseat the retaining means from said one predetermined position and to permit flow through the implement valve, to close the switch and to shutoff the prime mover and pump.

17. A control member, a valve spool, said control member slidably carried on said valve spool and having retaining means for retaining said control member in one of at least two positions relative to said valve spool, a lever operatively connected to said control member for moving said control member in one direction only relative to said valve spool until said retaining means seats on an abutment on said valve spool, and resilient means urging said control member and said valve spool in a direction opposite to the direction of movement by said lever.

18. A control member, a valve spool, said control member slidably carried on said valve spool, a retaining means for retaining said control member in one of at least two positions relative to said valve spool, a lever operatively connected to said control member for moving said control member in one direction only relative to said valve spool until said retaining means engages with an abutment, and resilient means urging said control member and said valve spool in a direction opposite to the direction of movement by said lever.

19. In a control member as claimed in claim 18 wherein said retaining means is on said control member and said abutment is on said valve spool.

20. In a control member as claimed in claim 18 wherein said retaining means is a spring biased ball.

21. A control member, a valve spool, said control member slidably carried on said valve spool and having retaining means for retaining said control member in one of at least two positions relative to said valve spool, actuation means operatively connected to said control member for moving said control member in one direction only relative to said valve spool until said retaining means seats on an abutment on said valve spool, and resilient means urging said control member and said valve spool in a direction opposite to the direction of movement by said actuation means.

22. In a control member as claimed in claim 21 wherein said retaining means is on said control member and said abutment is on said valve spool.

23. In a control member as claimed in claim 21 wherein said retaining means is a spring biased ball.

24. In a control member as claimed in claim 21 wherein said actuation means is a hand-operated lever.

* * * * *